US008151214B2

(12) United States Patent
Loverin et al.

(10) Patent No.: US 8,151,214 B2
(45) Date of Patent: Apr. 3, 2012

(54) SYSTEM AND METHOD FOR COLOR CODING LIST ITEMS

(75) Inventors: Darrell J. Loverin, Boxborough, MA (US); Jodi L. Coppinger, Merrimack, NH (US); Mary Elizabeth Raven, Merrimack, NH (US); Paul B. Moody, Hyde Park, VT (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 10/745,485

(22) Filed: Dec. 29, 2003

(65) Prior Publication Data

US 2005/0144570 A1 Jun. 30, 2005

(51) Int. Cl.
*G06F 3/048* (2006.01)
*G06F 3/00* (2006.01)

(52) U.S. Cl. ........ 715/823; 715/764; 715/772; 715/821; 715/206; 715/207

(58) Field of Classification Search .................. 715/712, 715/764, 772, 776, 822, 823, 852, 855, 206, 715/207, 821
See application file for complete search history.

(56) References Cited

U.S. PATENT DOCUMENTS

| 4,694,406 A | | 9/1987 | Shibui et al. | 364/518 |
|---|---|---|---|---|
| 4,853,878 A | * | 8/1989 | Brown | 715/202 |
| 5,038,138 A | | 8/1991 | Akiyama et al. | 340/724 |
| 5,175,813 A | | 12/1992 | Golding et al. | 395/157 |
| 5,317,306 A | | 5/1994 | Abraham et al. | 345/118 |
| 5,361,361 A | | 11/1994 | Hickman et al. | 395/700 |
| 5,394,523 A | * | 2/1995 | Harris | 345/501 |
| 5,398,310 A | | 3/1995 | Tchao et al. | 395/144 |
| 5,506,951 A | | 4/1996 | Ishikawa | 395/157 |
| 5,526,480 A | | 6/1996 | Gibson | 395/154 |
| 5,563,996 A | | 10/1996 | Tchao | 395/144 |
| 5,610,828 A | * | 3/1997 | Kodosky et al. | 716/11 |

(Continued)

FOREIGN PATENT DOCUMENTS

CN 1194703 A 9/1998

(Continued)

OTHER PUBLICATIONS

Venolia, Gina, et al., "Understanding Sequence and Reply Relationships within Email Conversations: A Mixed-Model Visualization", *Paper: Integrating Tools and Tasks*, vol. No. 5, Issue No. 1, Ft. Lauderdale, Florida, Apr. 5-10, 2003, pp. 361-368.

(Continued)

*Primary Examiner* — Nicholas Augustine
(74) *Attorney, Agent, or Firm* — Pillsbury Winthrop Shaw Pittman LLP

(57) ABSTRACT

A system and method is provided to assist a user in selecting, identifying, and handling email messages. A selection color module may provide for the display of color coding and selection highlighting. The selection color module may provide a secondary highlighting color to indicate messages related to a selected message. A category navigation module may provide one or more of the following: an indicator that provides the user with a number of items that are off the screen for a particular category, a command that causes the first entry for a category to be scrolled into view, a label to indicate the number of items in a particular category matching a particular criteria, and/or a control for scrolling between next or previous categories.

20 Claims, 5 Drawing Sheets

U.S. PATENT DOCUMENTS

| | | | | |
|---|---|---|---|---|
| 5,623,613 | A | 4/1997 | Rowe et al. | 395/353 |
| 5,732,399 | A | 3/1998 | Katiyar et al. | 705/5 |
| 5,737,553 | A * | 4/1998 | Bartok | 715/764 |
| 5,812,123 | A | 9/1998 | Rowe et al. | 345/327 |
| 5,870,770 | A | 2/1999 | Wolfe | 707/501 |
| 5,894,311 | A * | 4/1999 | Jackson | 345/440 |
| 5,903,267 | A | 5/1999 | Fisher | 345/341 |
| 5,905,863 | A | 5/1999 | Knowles et al. | 395/200.36 |
| 5,918,233 | A | 6/1999 | La Chance et al. | 707/104 |
| 5,948,058 | A | 9/1999 | Kudoh et al. | 709/206 |
| 5,999,159 | A | 12/1999 | Isomura | 345/112 |
| 5,999,179 | A * | 12/1999 | Kekic et al. | 715/734 |
| 6,008,803 | A | 12/1999 | Rowe et al. | 345/327 |
| 6,026,388 | A | 2/2000 | Liddy et al. | 707/1 |
| 6,034,688 | A | 3/2000 | Greenwood et al. | 345/353 |
| 6,052,121 | A | 4/2000 | Webster et al. | 345/329 |
| 6,078,306 | A | 6/2000 | Lewis | 345/123 |
| 6,088,696 | A * | 7/2000 | Moon et al. | 707/10 |
| 6,154,740 | A * | 11/2000 | Shah | 707/7 |
| 6,184,881 | B1 | 2/2001 | Medl | 345/339 |
| 6,252,597 | B1 | 6/2001 | Lokuge | 345/353 |
| 6,272,537 | B1 * | 8/2001 | Kekic et al. | 709/223 |
| 6,289,361 | B1 | 9/2001 | Uchida | 707/501 |
| 6,300,967 | B1 | 10/2001 | Wagner et al. | 345/784 |
| 6,340,979 | B1 | 1/2002 | Beaton et al. | 345/764 |
| 6,348,935 | B1 | 2/2002 | Malacinski et al. | 345/853 |
| 6,380,947 | B1 | 4/2002 | Stead | 345/645 |
| 6,388,682 | B1 * | 5/2002 | Kurtzberg et al. | 715/764 |
| 6,396,513 | B1 * | 5/2002 | Helfman et al. | 715/752 |
| 6,424,995 | B1 * | 7/2002 | Shuman | 709/206 |
| 6,442,440 | B1 | 8/2002 | Miller | 700/83 |
| 6,499,026 | B1 * | 12/2002 | Rivette et al. | 707/2 |
| 6,529,744 | B1 | 3/2003 | Birkler et al. | 455/557 |
| 6,549,218 | B1 * | 4/2003 | Gershony et al. | 715/781 |
| 6,563,518 | B1 * | 5/2003 | Gipalo | 715/762 |
| 6,582,474 | B2 | 6/2003 | LaMarca et al. | 715/500 |
| 6,628,996 | B1 | 9/2003 | Sezaki et al. | 700/83 |
| 6,631,398 | B1 | 10/2003 | Klein | 709/206 |
| 6,700,591 | B1 * | 3/2004 | Sharpe | 715/762 |
| 6,701,346 | B1 | 3/2004 | Klein | 709/206 |
| 6,738,787 | B2 * | 5/2004 | Stead | 707/104.1 |
| 6,756,997 | B1 * | 6/2004 | Ward et al. | 715/716 |
| 6,782,393 | B1 | 8/2004 | Balabanovic et al. | 707/104.1 |
| 6,826,596 | B1 * | 11/2004 | Suzuki | 709/206 |
| 6,829,601 | B2 | 12/2004 | Honda et al. | 707/4 |
| 6,895,404 | B2 | 5/2005 | Rowley | 707/10 |
| 6,917,373 | B2 | 7/2005 | Vong et al. | 345/840 |
| 6,930,709 | B1 * | 8/2005 | Creamer et al. | 348/211.3 |
| 6,972,776 | B2 | 12/2005 | Davis et al. | 345/684 |
| 7,028,263 | B2 * | 4/2006 | Maguire | 715/758 |
| 7,030,890 | B1 | 4/2006 | Jouet et al. | 345/619 |
| 7,036,092 | B2 | 4/2006 | Sloo et al. | 715/841 |
| 7,062,536 | B2 * | 6/2006 | Fellenstein et al. | 709/206 |
| 7,107,268 | B1 | 9/2006 | Zawadzki et al. | 707/9 |
| 7,117,445 | B2 * | 10/2006 | Berger | 715/752 |
| 7,120,646 | B2 * | 10/2006 | Streepy, Jr. | 707/104.1 |
| 7,127,476 | B2 | 10/2006 | Narahara | 707/203 |
| 7,137,074 | B1 * | 11/2006 | Newton et al. | 715/835 |
| 7,139,800 | B2 * | 11/2006 | Bellotti et al. | 709/206 |
| 7,209,246 | B2 | 4/2007 | Suda et al. | 358/1.14 |
| 7,243,125 | B2 | 7/2007 | Newman et al. | 709/206 |
| 7,320,105 | B1 | 1/2008 | Sinyak et al. | 715/526 |
| 7,421,664 | B2 | 9/2008 | Wattenberg et al. | 715/823 |
| 7,421,690 | B2 | 9/2008 | Forstall et al. | 718/100 |
| 7,454,716 | B2 | 11/2008 | Venolia | 715/853 |
| 7,487,458 | B2 * | 2/2009 | Jalon et al. | 715/765 |
| 7,505,974 | B2 * | 3/2009 | Gropper | 707/10 |
| 7,512,901 | B2 * | 3/2009 | Vong et al. | 715/840 |
| 7,523,126 | B2 * | 4/2009 | Rivette et al. | 707/102 |
| 7,908,566 | B2 | 3/2011 | Wilcox et al. | 715/784 |
| 7,917,867 | B2 | 3/2011 | Wattenberg et al. | 715/823 |
| 2002/0004793 | A1 | 1/2002 | Keith, Jr. | 707/1 |
| 2002/0019827 | A1 | 2/2002 | Shiman et al. | 707/200 |
| 2002/0051015 | A1 | 5/2002 | Matoba | 345/764 |
| 2002/0073112 | A1 | 6/2002 | Kariya | 707/500 |
| 2002/0073157 | A1 * | 6/2002 | Newman et al. | 709/206 |
| 2002/0080187 | A1 | 6/2002 | Lawton | 345/810 |
| 2002/0084991 | A1 | 7/2002 | Harrison et al. | 345/173 |
| 2002/0099775 | A1 * | 7/2002 | Gupta et al. | 709/205 |
| 2002/0120858 | A1 | 8/2002 | Porter et al. | 713/200 |
| 2002/0128047 | A1 * | 9/2002 | Gates | 455/566 |
| 2002/0138834 | A1 | 9/2002 | Gerba et al. | 725/42 |
| 2002/0174183 | A1 * | 11/2002 | Saeidi | 709/206 |
| 2002/0186252 | A1 | 12/2002 | Himmel et al. | 345/767 |
| 2002/0194280 | A1 * | 12/2002 | Altavilla et al. | 709/206 |
| 2003/0014482 | A1 | 1/2003 | Toyota et al. | 709/203 |
| 2003/0101065 | A1 | 5/2003 | Rohall et al. | 705/1 |
| 2003/0146941 | A1 | 8/2003 | Bailey et al. | 345/830 |
| 2003/0154212 | A1 * | 8/2003 | Schirmer et al. | 707/103 R |
| 2003/0163537 | A1 | 8/2003 | Rohall et al. | 709/206 |
| 2003/0167310 | A1 * | 9/2003 | Moody et al. | 709/206 |
| 2003/0226152 | A1 | 12/2003 | Billmaier et al. | 725/135 |
| 2004/0046776 | A1 * | 3/2004 | Phillips et al. | 345/700 |
| 2004/0056899 | A1 * | 3/2004 | Sinclair et al. | 345/800 |
| 2004/0068544 | A1 * | 4/2004 | Malik et al. | 709/206 |
| 2004/0073616 | A1 * | 4/2004 | Fellenstein et al. | 709/206 |
| 2004/0243926 | A1 * | 12/2004 | Trenbeath et al. | 715/501.1 |
| 2004/0260756 | A1 * | 12/2004 | Forstall et al. | 709/200 |
| 2004/0268265 | A1 * | 12/2004 | Berger | 715/752 |
| 2005/0004989 | A1 | 1/2005 | Satterfield et al. | 709/206 |
| 2005/0108345 | A1 * | 5/2005 | Suzuki | 709/206 |
| 2005/0108351 | A1 * | 5/2005 | Naick et al. | 709/207 |
| 2005/0144569 | A1 | 6/2005 | Wilcox et al. | 715/822 |
| 2005/0144571 | A1 | 6/2005 | Loverin et al. | 715/822 |
| 2005/0144572 | A1 | 6/2005 | Wattenberg et al. | 715/822 |
| 2006/0271381 | A1 * | 11/2006 | Pui | 705/1 |
| 2008/0114838 | A1 * | 5/2008 | Taylor | 709/206 |
| 2008/0270935 | A1 | 10/2008 | Wattenberg et al. | 715/784 |
| 2011/0099510 | A1 | 4/2011 | Wilcox et al. | 715/784 |

FOREIGN PATENT DOCUMENTS

| | | |
|---|---|---|
| CN | 1285557 A | 2/2001 |
| EP | 1077417 A2 | 2/2001 |
| EP | 1 232 434 B1 | 8/2005 |
| JP | 08286871 A | 11/1996 |
| JP | 09-326822 | 12/1997 |
| JP | 2001-325296 | 11/2001 |
| JP | 2003-271526 | 9/2003 |
| KR | 2002-0050785 | 6/2002 |
| WO | WO 97/24684 | 7/1997 |
| WO | WO 97/44748 | 11/1997 |
| WO | WO 01/23995 | 4/2001 |

OTHER PUBLICATIONS

Smith, Marc A., et al., "Visualization Components for Persistent Conversations", *CHI 2001*, vol. No. 3, Issue No. 1, Mar. 31-Apr. 5, 2001, pp. 136-143.

Rohall, Steven L., et al., "Email Visualizations to Aid Communications", *IEEE Symposium on Information Visualization*, Oct. 22-23, 2001, 5 pages.

\* cited by examiner

FIG. 2B

| | | | |
|---|---|---|---|
| Day 1 | (12 items off screen) | | |
| | 🔲 Laura Hanson | For Thursday's budget meeting | |
| | ◊ Sue Cassin | Diversity hiring goals | HR Teamroom |
| 2:00 pm | ◊ John DeLay | Let's hook up for the awards dinner | |
| | ◊ John DeLay | my cellphone number | |
| 4:00 | 🔲 David Corell | Distribute last minute changes to budget team | Finance Teamrm |
| | ChemDigest | Chemicals Digest: Day 1 | Newsletter DB |
| | Plastic Daily | Plastics Daily: New OSHA Fumes Rule has Indus... | Newsletter DB |
| | ◊ Accounting | Latest numbers on research lab aquistion | Finance Teamrm |
| 6:12 | 🔲 Ben Fields | 🔲 6+ Vulcan Presentation Review Thur at 4pm | |
| | 🔲 Laura Hanson | Optional reading for the budget review | |
| | 🔲 John DeLay | Awards dinner listings | 📎 |
| Day 2 | (36 items) | | |
| Day 3 | | | |
| 7:00 am | ◊ Sue Cassin | Hiring meeting agenda (thur 5pm) | |
| | 🔲 Laura Hanson | FYI: We are seeing DuPont this week | Sales Leads |
| 7:18 | 🔲 Mike Rowles | 🔲 6+ Re: Vulcan wants longer contract | |
| | 🔲 Ben Fields | Re: GE Roadmap presentation first draft | |
| | Austin Chem | Join us for a special evening | |
| 9:00 | ⊕ Marketing | Consolidated Plastics wins RebokMP3 contract | |
| | ◊ Jane Rolles | Marsha's party location | |
| | Sam Racicot | Can we meet next week? | + Sales lead |

Secondary Highlighting 248

Selection Highlighting 244

SYSTEM AND METHOD FOR COLOR CODING LIST ITEMS

CROSS-REFERENCE TO RELATED APPLICATIONS

This application is related to U.S. Published Patent Application No. 2005/0144571 entitled "System and Method for Secondary Selection Highlighting," U.S. Pat. No. 7,421,664, entitled "System and Method for Providing a Category Separator in a List of Documents," and U.S. Published Patent Application No. 2005/0144569 entitled "System and Method for Scrolling Among Categories in a List of Documents," each filed herewith and incorporated by reference in their entirety.

FIELD OF THE INVENTION

The invention relates to features to assist a user in selecting, identifying, and handling items such as email messages.

BACKGROUND OF THE INVENTION

Some conventional email systems use color coding to identify certain items that have a field or attribute with a particular value. This allows those items to be easily identified. For example in an email context, a name of a particular sender may be highlighted a particular color for each message sent by the particular sender (i.e. if sender is "Paul Smith" then item background color is "blue"). Typically, the color coding is applied to the particular field or attribute (i.e., the name, date, subject), rather than the entire item that includes the particular attribute.

Further, some conventional email systems use highlighting to indicate that a particular item (or items) have been selected. Typically, this "selection highlighting" results in the entire line corresponding to the item to be highlighted with a particular color. However, a problem arises with those systems that use both selection highlighting and color coding in that many times a user cannot see or distinguish between the selection highlighting and the color coding at the same time.

In order to accommodate this problem, some conventional systems that use color coding typically use an altogether different mechanism for selecting items, such as, for example, selection boxes or outlines. However, these conventional mechanisms of selecting do not distinguish the selected message as readily as selection highlighting.

What is needed is a mechanism to provide both selection highlighting and color coding in a single item.

SUMMARY OF THE INVENTION

The invention relates to color selection features to assist a user in selecting, identifying, and handling items such as email messages. More particularly, the invention provides a color coordination selection feature that accommodates color coding and selection highlighting.

According to one embodiment of the invention, a color coordination selection feature provides both selection highlighting and color coding to be applied to items and viewed by the user. Thus, if both color coding and selection highlighting apply to a particular item, a user may distinguish the two. According to the invention, that portion of the item that corresponds to an attribute or field with a particular value is the color coded portion, while the remaining portions of the selected item are highlighted. If the selected item does not include any color coded portion, the entire item is highlighted according to the selection highlighting.

Other objects and features of the invention will become apparent from the following detailed description considered in connection with the accompanying drawings. The drawings are designed for purposes of illustration only and the invention is not limited to the particulars shown therein. Various alternatives and modifications within the scope of the invention will be apparent from the description contained herein.

BRIEF DESCRIPTION OF THE DRAWINGS

FIGS. 2A and 2B illustrate various features provided by a selection color module according to various embodiments of the invention.

DETAILED DESCRIPTION OF THE INVENTION

Various embodiments of the invention are described below in terms of email systems that include one or more messages. However, it will become apparent from reading the following specification how various aspects of the invention may be used with other types of systems that include one or more items, such as, for example, file systems.

Figure 1:
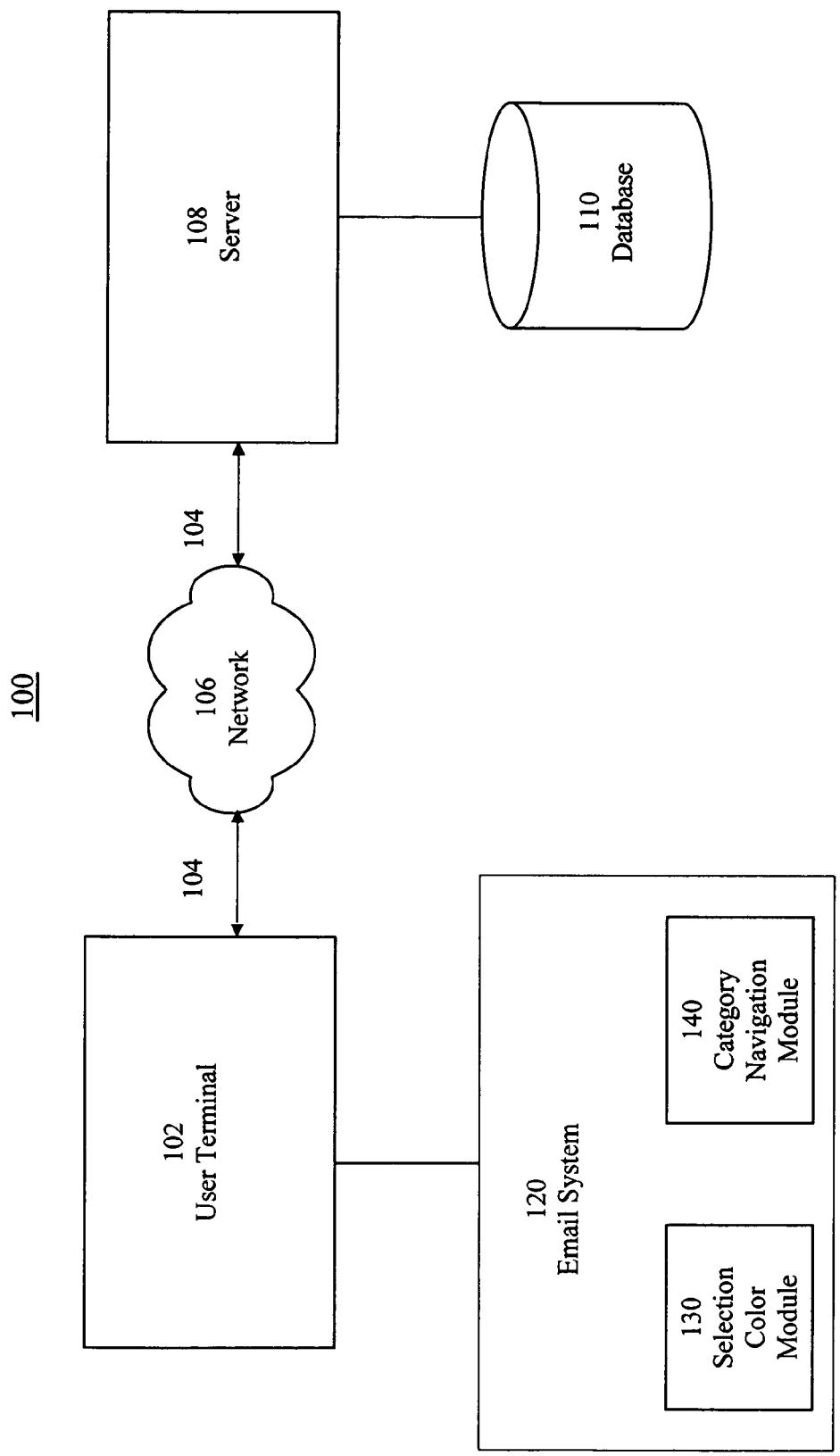
FIG. 1 illustrates a system according to one embodiment of the invention.

FIG. 1 illustrates a system 100 that may be used in accordance with various embodiments of the invention. Accordingly to the invention, system 100 may provide various features, such as, for example, enhanced visual email features, to assist a user in selecting, identifying, and handling items, such as email messages. In some embodiments of the invention, system 100 includes one or both of a selection color module 130 and a category navigation module 140. Selection color module 130 may provide the user with various color coordination features. Category navigation module 140 may assist the user in navigating the displayed messages.

In the embodiments illustrated in FIG. 1, selection color module 130 and category navigation module 140 may be utilized on or in conjunction with an email system 120 located at or operable with a user terminal 102. Although various embodiments of the invention are described utilizing selection color module 130 and category navigation module 140 on user terminal 102, it shall be understood by those skilled in the art that selection color module 130 and/or category navigation module 140 may be located on a 108 server or any machine or machines associated with user terminal 102.

User terminal 102 is coupled to a server 108 over a network 106 via a communications link 104. Examples of user terminal 102 may include any one or more of, for example, a desktop computer, a laptop or other portable computer, a hand-held computer device such as a Blackberry, a Personal Digital Assistant (PDA), a web-enabled mobile phone, or a Palm Pilot, or any other computer device.

Network 106 may include any one or more networks. For instance, network 106 may include the Internet, an intranet, a PAN (Personal Area Network), a LAN (Local Area Network), a WAN (Wide Area Network), a SAN (Storage Area Network), a MAN (Metropolitan Area Network), or other network.

Communications link 104 may include any one or more communications links. For instance, communications link 104 may include a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications link.

Server 108 may be or include, for instance, a workstation running Microsoft Windows™ N™, Microsoft Windows™ 2000, Unix, Linux, Xenix, IBM, AIX™, Hewlett-Packard U™, Novell Netware™, Sun Microsystems Solaris™, OS/2™, BeOS™, Mach, Apache, OpenStep™, or other operating system or platform.

As illustrated in FIG. 1, a database 110 may be operatively coupled to serer 108. Database 110 may store or otherwise include any information or data used by system 100. Although database 110 is illustrated as operatively coupled to server 108, it shall be understood by those skilled in the art that database 110 may be located on user terminal 102 or any machine or machines associated with user terminal 102 or operatively coupled to server 108 via a network as would be apparent.

Database 110 may store or otherwise include any type of data or information, Database 110 may include, or interface to, for example, the Oracle™ relational database sold commercially by Oracle Corporation, Informix™, DB2 (Database 2) or other data storage or query formats, platforms, or resources such as OLAP (On Line Analytical Processing), SQL (Standard Language Query), a SAN (storage area network), Microsoft Access™ or any other type of database.

Figure 2A:
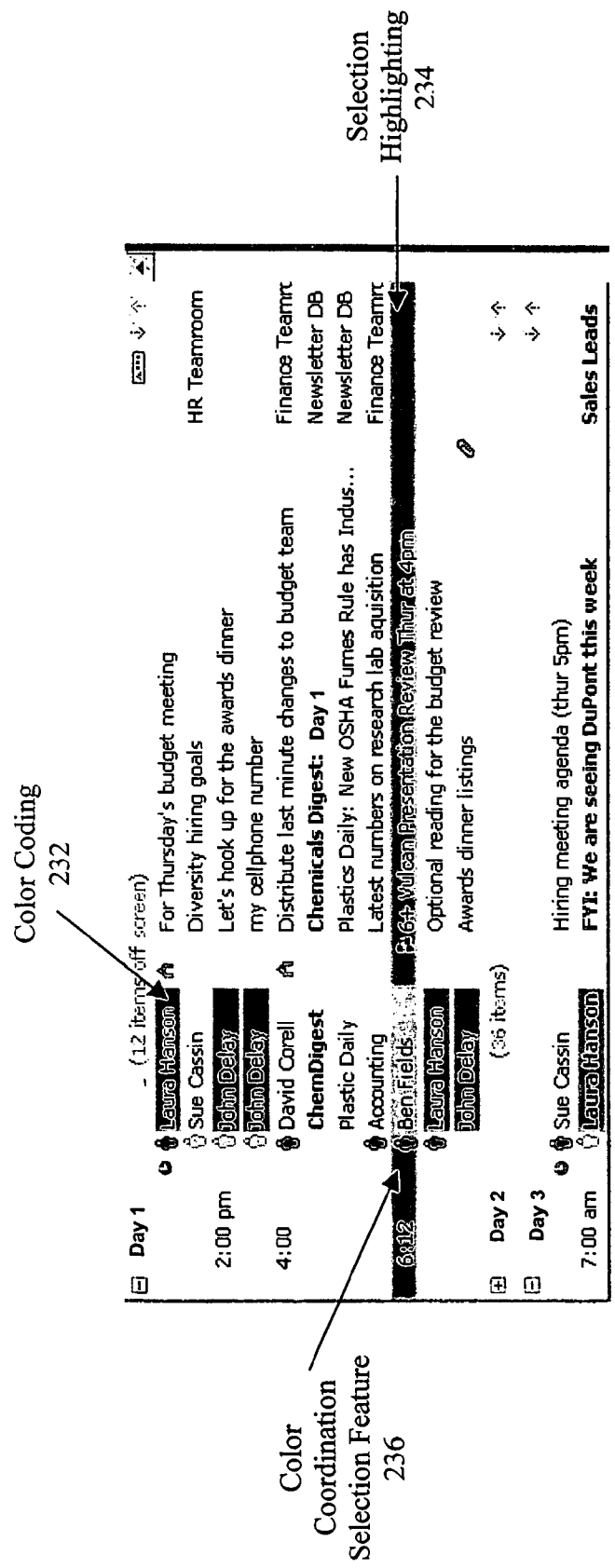

FIG. 2A illustrates various color coordination selection features provided by selection color module 130 to assist a user in selecting, identifying, and/or handling email messages in accordance with one or more embodiments of the invention. Selection color module 130 provides for both a color coding 232 and a selection highlighting 234 of an item so that a user may distinguish between the two, as described below.

Some conventional email systems use color coding 232 to identify certain items that have a field or attribute with a particular value allowing these items to be easily identified. In FIG. 2A, for example, a name "Laura Hanson" is color coded in green, a name "John Delay" is color coded in pink, and a name "Ben Fields" is color coded in yellow. As illustrated, color coding 232 is typically applied to the particular field or attribute (i.e., the name, date, subject), rather than the entire message that includes the particular attribute.

Some conventional email systems use selection highlighting 234 to indicate that a particular message has been selected. In conventional systems, selection highlighting 234 results in the entire line corresponding to a selected message to be highlighted with a particular color. For example, as illustrated in FIG. 2A, a message from "Mike Rowles" is highlighted in a royal blue color to indicate it as the selected message.

in some embodiments of the invention, selection highlighting 234 and color coding 232 are combined into a color coordination selection feature 236 with regard to a single message whereby a user may distinguish between them, in some embodiments of the invention, selection color module 130 implements a selection coloring mechanism or process that color codes one or more portions of the selected item that have a particular value(s) and highlights the remaining portions of the selected item. According to the invention, if both selection highlighting 234 and color coding 232 apply to the selected item, both may be distinguished by a user. As will be discussed in further detail below, selection highlighting 234 may be applied to a selected messages as well as messages related to the selected message. As would be appreciated, color coordination selection feature 236 may be applied to various messages—selected, related, or otherwise—to coordinate aspects of more than one color or highlighting operation applied to a single message.

As illustrated in FIG. 2A, a message from "Ben Fields" entitled "6+Vulcan Presentation Review Thur at 4 pm" illustrates color coordination selection feature 236 that combines color coding 232 and selection highlighting 234. Color coding 232 results in "Ben Fields" being color coded in yellow, while the remaining portions of the message are highlighted in light blue.

As will be discussed in further detail below with regard to other aspects of the invention, highlighting, such as selection highlighting 234, may be applied to a selected messages as well as messages related to the selected message. As would be appreciated, color coordination selection feature 236 may be applied to various messages—selected, related, or otherwise—to coordinate aspects of more than one color or highlighting operation applied to a single message.

FIG. 2A illustrates another color coordination selection feature provided by selection color module 130 to assist a user in selecting, identifying, and/or handling email messages in accordance with one or more embodiments of the invention. Selection color module 130 provides for a secondary highlighting features to indicate to a user a relationship between a selected message and one or more other messages.

In some embodiments of the invention, secondary highlighting is applied to a message when that message is related to a message selected by the user. Once a user selects a message, selection color module 130 determines if any other messages are related to the selected message. For example, FIG. 2B illustrates a selection highlighting 244 (similar to selection highlighting 234 in FIG. 2A), in which a selected message from "Mike Rowles" entitled "6+Re: Vulcan wants longer contact" is highlighted in a royal blue color. A message from "Ben Fields" entitled "6+Vulcan Presentation Review Thur at 4 pm" is related to the selected message. According various embodiments of the invention, a secondary highlighting 248 is applied to the related message (i.e., the message from "Ben Fields"). In this example, the related message is highlighted in a light blue color. As would be appreciated, various colors for secondary highlighting 248 may be used, including the same color applied for selection highlighting 244.

Messages may be identified as related to the selected message through various mechanisms. One mechanism includes identifying items with matching attribute values, such as subject matter or keywords included in the subject line or message itself. Other mechanisms may utilize various threading services such as those described in U.S. patent application Ser. No. 10/334,087 (Publication No. U.S. 20030163537A1), entitled "Method and Apparatus for Handling Conversation Threads and Message Groupings as a Single Entity," filed Dec. 30, 2002, and U.S. patent application Ser. No. 09/995,151 (Publication No. U.S. 20030101065A1), entitled "Method and Apparatus for Maintaining Conversation Threads in Electronic Mail," filed Nov. 27, 2001, the specifications of which are herein incorporated by reference in their entirety. It should be noted that the invention is not limited to any particular mechanism for determining threads among a set of documents including email messages. Once the selection color module determines if there are any related messages, the related messages are indicated as such using secondary highlighting 248.

As would be appreciated, various colors for secondary highlighting 248 may be used, including the same color applied for selection highlighting 244. In some embodiments of the invention, the color of secondary highlighting 248 (i.e., "secondary color") is based on or otherwise related to the color of selection highlighting 244 (i.e., "selection color"). In these embodiments, when the selection color is changed, the secondary color is changed in accordance with the selection color. In some embodiments of the invention, the secondary color is changed in proportion to the change in the selection color. In some embodiments of the invention, the secondary color is derived from the selection color. For example, as illustrated in FIG. 2B, a light blue color is used for secondary highlighting 248, which is derived from a royal blue color of selection highlighting 244.

Coordination the selection color with the highlighting color is desirable for aesthetic reasons. This coordination also assists the user in identifying the various highlighted items, especially, when high contrast colors are used.

Figure 3:
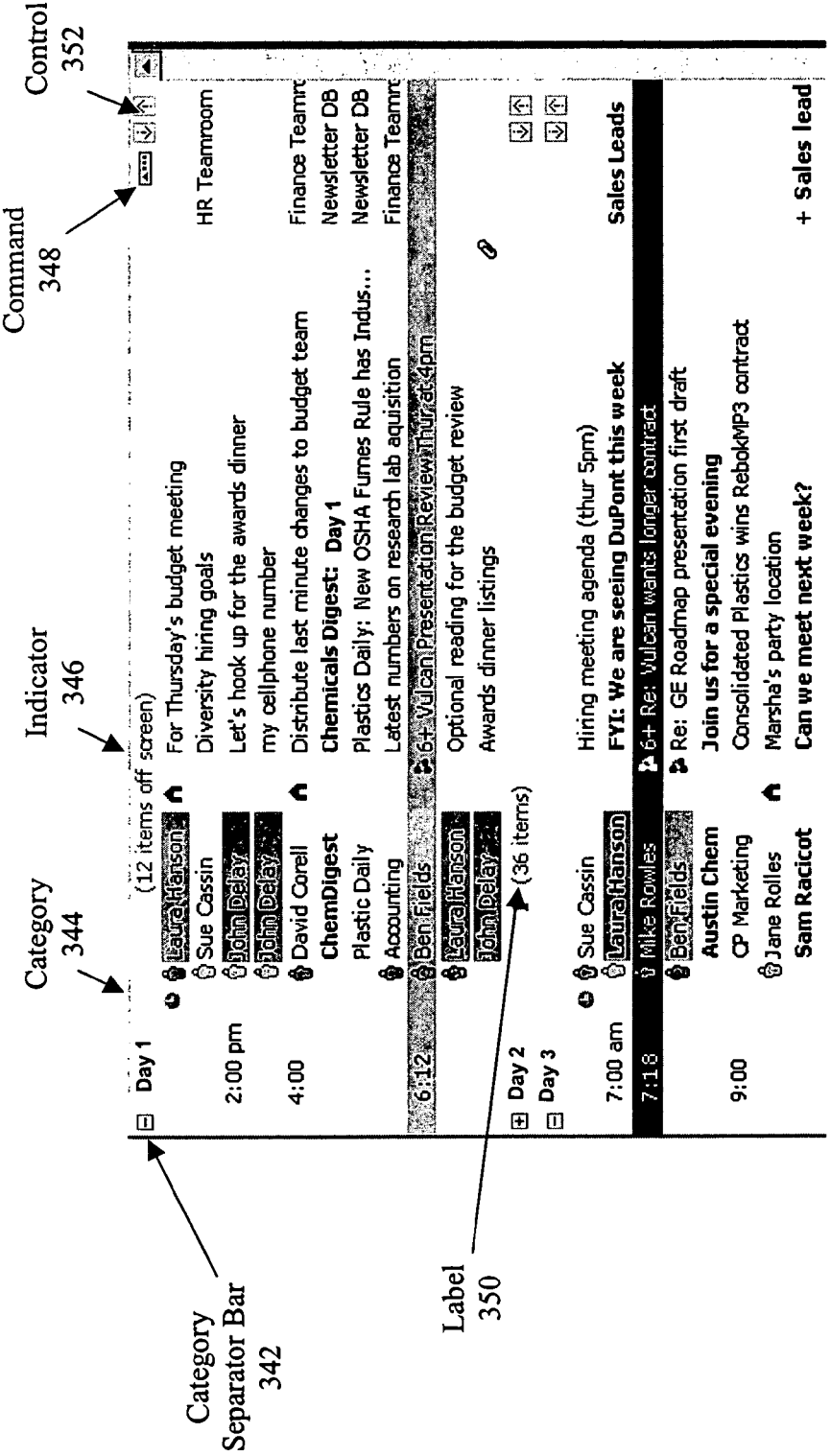
FIG. 3 illustrates features provided by a category navigation module according to one embodiment of the invention.
Figure 4:
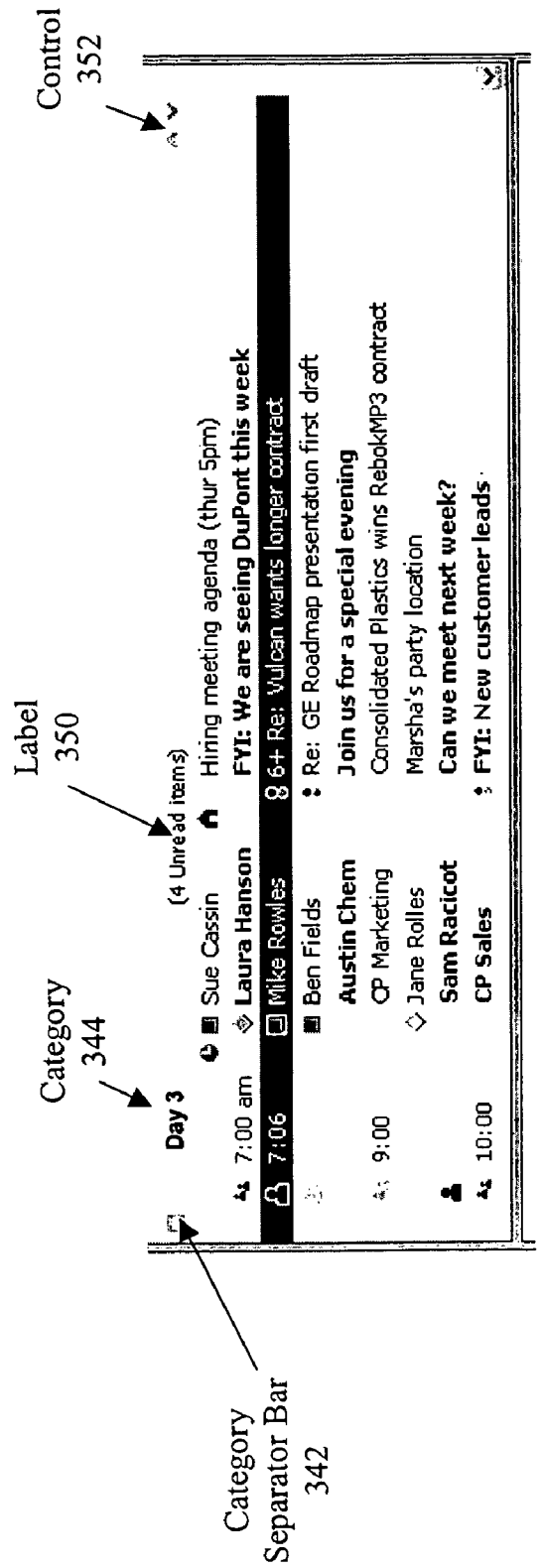
FIG. 4 illustrates a label that indicates a number of items in a particular category of items according to one embodiment of the invention.

FIG. 3 and FIG. 4 illustrate various aspects of the invention provided via category navigation module 140. Category navigation module 140 assists the user with navigating among displayed items, such as email messages.

FIG. 3 illustrates an indicator 346 that provides a user with a number of items that are "off screen" for a particular category 344. In some embodiments of the invention, off screen items may include those items "above" the first line on a display. In other embodiments of the invention, off screen items may include those items "below" the last line on a display. In still other embodiments, off screen items include both those above and below the first and last lines, respectively.

In some embodiments of the invention, category navigation module 140 displays items, such as email messages, by categories, such as a category 344. For example, in FIG. 3, category 344 includes a date. As illustrated, these dates include: "Day 1," "Day 2," and "Day 3." Messages may be separated into various categories as would be appreciated, including, but not limited to, author, subject matter, importance, or any other category.

In some embodiments of the invention, categories 344 are separated with a category separator bar 342. Category separator bar 342 controls the display of categories 344 such that the user may expand or collapse the messages included therein. For example, as illustrated in FIG. 3, messages in "Day 1" and "Day 3" are expanded, whereas messages in "Day 2" are collapsed.

In some embodiments of the invention, when a user scrolls through the messages included in a particular category 344, such that some messages of the particular category 344 are scrolled off screen above the first line, category separator bar 342 remains in view by becoming fixed in the first line of the display.

In some embodiments of the invention, while messages included in a particular category 344 are partially on-screen with some messages scrolled above the fixed category separator bar 342, category navigation module 140 may display indicator 346 that provides the user with an indication of a number of messages that are off screen for that category 344. For example, in FIG. 3, indicator 346 reads "12 items off screen" to illustrate to the user that 12 messages included in the category "Day 1" are not displayed on the screen. As would be appreciated, indicator 346 may refer to a number of items above the first line, a number of items below the last line, or a combination of the two.

In some embodiments of the invention, if all messages in a particular category 344 are displayed on the screen, indicator 346 may not be displayed. For example, as illustrated in FIG. 3, there is no indicator 346 for the category entitled "Day 3," illustrating to the user that all messages in the category are displayed on the screen.

In some embodiments of the invention, category navigation module 140 provides a command 348 that causes the first entry of a particular category 344 to be scrolled into view. Accordingly, when indicator 346 illustrates to the user that a certain number of items of a particular category 344 are off screen, the user can invoke command 348 thereby causing the first message of the particular category 344 to be displayed. When the user selects command 348, no items of the particular category 344 are located above category separator bar 342.

In some embodiments of the invention, if all messages of a particular category 344 are displayed on the screen, command 348 is not displayed. Because all messages in the particular category 344 are displayed on the screen, the first message of the particular category 344 is already displayed and there may be no need to provide this functionality. For example, as illustrated in FIG. 3, the category line separator for "Day 3" does not include a command 348 because all messages in the category are already displayed on the screen. If a message in such a category becomes displaced from the screen, command 348 would be included in this category line separator as would be appreciated.

In some embodiments of the invention, category navigation module 140 may provide a label 350 to indicate the number of items in a particular category 344 matching a particular criteria. The particular criteria may be directed toward any characteristic of the message including, but not limited to, a number of messages included in a particular category, a status of the messages (i.e., unread or read), a level of importance of the messages (i.e., urgent or high importance), or other characteristic of the message(s).

For example, as illustrated in FIG. 3, label 350 corresponds to a number of messages included in the category "Day 2" as "36 items". As illustrated, label 350 may be provided even when category separator bar 342 is collapsed and not showing any messages included in a particular category 344.

A further example is illustrated in FIG. 4 where a label 350 corresponds to a number of items unread ("4 Unread items") in the category "Day 3." Label 350 may be displayed when indicator 346 is not required (i.e., all messages in the category are displayed on the screen), when indicator 346 is not desired to be displayed (i.e., the user does not want indicator 346 to be displayed), when indicator 346 is not able to be displayed (i.e., email system 120 cannot display indicator 346), or in conjunction with indicator 346 (i.e., indicator 346 and label 350 may both be located in category separator line). Further, in some embodiments of the invention, category navigation module 140 may display multiple labels 350 to illustrate various characteristics of a particular category 344.

According to another embodiment of the invention, category navigation module 140 may provide a control 352 on at least one category separator line 342 for scrolling between categories. As illustrated in FIGS. 3 and 4, control 352 may include an "up" arrow symbol to correspond with, for example, a previous category, and a "down" arrow symbol to correspond with, for example, a next category. However, various symbols or indicators may be used to indicate scrolling between next or previous categories.

In some embodiments of the invention, control 352 changes the selected category from one category to either the next category or the previous category, depending on which symbol is invoked. If more than one category is displayed on the screen, these categories continue to be displayed while the selected category is changed via control 352. For example, as illustrated in FIG. 3, a user wishing to display a category corresponding to Wednesday of the prior week may do so by invoking control 352 on category separator bar 342 for "Day 2" a number of times. More specifically, the user may click the up arrow symbol seven times, each of which would change the selected category to the previous day, ultimately changing to the same weekday in the prior week.

In some embodiments of the invention, when control 352 is invoked, the categories remain in their positions relative to one another, and the display scrolls back through each of the prior days. In other embodiments of the invention, only the category corresponding to the invoked control 352 is changed while the other categories displayed remain the same. Thus, in the example described above where the user invoked the up arrow symbol seven times, the display of FIG. 3 would include the categories for "Day 1" and "Day 3" while the "Day 2" category will have been changed to "Day-5" (i.e., corresponding to the same weekday in the prior week).

While particular embodiments of the invention have been described, it is to be understood that modifications will be apparent to those skilled in the art without departing from the spirit of the invention. The scope of the invention is not limited to the specific embodiments descried herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A computer-implemented method for color coding an item in a list of items displayed in a graphical user interface via a display device, each item having a plurality of displayed fields, and each of the plurality of displayed fields including a value or a symbol within the displayed field, the method comprising:
   applying a first color to at least one field of the plurality of displayed fields of the item based on the value or the symbol of said at least one field;
   receiving, via an input device, a user input related to a selection of either the item or a related item related to the item;
   in response to the user selecting either the item or the related item related to the item, applying a second color to at least one other field of the plurality of displayed fields of the item while maintaining the color of the at least one field in the first color; and
   displaying, in the graphical user interface, the at least one field colored in the first color and at least one other field colored in the second color,
   wherein the first color and the second color are other than a background color.

2. The method of claim 1, further comprising:
   in response to the user selecting the item, and without subsequent user intervention:
      (i) applying the second color to the at least one other field of the plurality of displayed fields of the selected item while maintaining the color of the at least one field in the first color;
      (ii) determining one or more items related to the selected item;
      (iii) applying a third color to at least one field of the plurality of displayed fields of each of the related items while maintaining the color of the at least one field of the selected item in the first color; and
      (iv) displaying, in the graphical user interface, the at least one field of the selected item colored in the first color, the at least one other field of the selected item colored in the second color, and the at least one field of each of the related items colored in the third color,
   wherein the third color, the first color, the second color, and the background color are different from one another.

3. The method of claim 2, wherein the third color is determined from the second color.

4. The method of claim 1, wherein each of the plurality of displayed fields is bounded by an area, the method further comprising:
   applying a first color to at least the bounded area of the at least one field of the item based on the value or the symbol of the at least one field, wherein prior to applying the first color, the color of the bounded area of the at least one field of the item is a background color, and in response to applying the first color, the color of the bounded area of the at least one field of the item is changed from the background color to the first color; and
   in response to the user selecting either the item or the related item related to the item, applying a second color to at least the bounded area of the at least one other field of the item while maintaining the color of the at least at one field in the first color, wherein prior to applying the second color, the color of the bounded area of the at least one other field of the item is a background color, and in response to applying the second color, the color of the bounded area of the at least one other field is changed from the background color to the second color.

5. The method of claim 3, wherein the third color is a lighter shade or a darker shade of the second color.

6. The method of claim 1, further comprising:
   applying a third color to at least one second field of the plurality of displayed fields of the item, wherein the third color is based on the value or the symbol of said at least one second field,
   wherein said at least one second field is different from said at least one field of the plurality of displayed fields of the item,
   wherein said at least one second field is different from said at least one other field of the plurality of displayed fields of the item, and
   in response to the user selecting either the item or the related item, applying the second color to the at least one other field of the plurality of displayed fields of the item while maintaining the color of the at least one field in the first color and the color of the at least one second field in the third color,
   wherein the first color, the second color, the third color, and the background color are different from one another.

7. The method of claim 1, wherein said at least one field of the plurality of displayed fields of the item contains data including identifying characteristics of the item and wherein said first color is determined based on specific identifying characteristics of said at least one field.

8. The method of claim 7, wherein said identifying characteristics identify at least one of an origin, a subject matter, and a priority of the item.

9. A computer-implemented method for color coding an item in a list of items displayed in a graphical user interface via a display device, the item having a plurality of displayed fields, and each of the plurality of displayed fields including a value or a symbol within the displayed field, the method comprising:
   presenting a color coded field of the item in a first color in the graphical user interface, said color coded field being one of the plurality of fields displayed in the graphical user interface, said first color determined based on the value or the symbol associated with the color coded field;

prior to a user selecting at least one of the item and a related item related to the item, presenting at least one non-highlighted field of the item in a background color, said at least one non-highlighted field being at least one of the plurality of fields displayed in the graphical user interface and other than the color coded field, wherein said first color and said background color are different from one another;

receiving, via an input device, a user input related to a selection of either the item or a related item related to the item;

in response to the user selecting either the item or the related item, changing the at least one non-highlighted field of the item to at least one highlighted field of the item by changing a color of the at least one non-highlighted field from said background color to a second color while maintaining the color coded field in the first color; and displaying, in the graphical user interface, the color coded field colored in the first color and the at least one highlighted field colored in the second color, wherein said first color, said second color and said background color are different from one another.

10. The method of claim 9, further comprising:
in response to the user selecting the item, and without subsequent user intervention:
  (i) changing the at least one non-highlighted field of the selected item to at least one highlighted field of the selected item by changing a color of the at least one non-highlighted field from said background color to the second color while maintaining the color coded field in the first color;
  (ii) determining one or more items related to the selected item; and
  (iii) applying a third color to at least one field of the plurality of displayed fields of each of the related items while maintaining the color of the color coded field in the first color; and
  (iv) displaying, in the graphical user interface, the color coded field colored in the first color, the at least one highlighted field colored in the second color, and the at least one field of each of the related items colored in the third color,
  wherein the third color, the first color, the second color, and the background color are different from one another.

11. The method of claim 10, wherein the third color is determined from the second color.

12. The method of claim 9, wherein each of the plurality of displayed fields is bounded by an area, the method further comprising:
presenting at least the bounded area of the color coded field of the item in the first color, wherein prior to presenting the bounded area in the first color, the color of the bounded area of the color coded field of the item is a background color, and in response to presenting the bounded area in the first color, the color of the bounded area of the color coded field of the item is changed from the background color to the first color;
prior to the user selecting either the item or the related item, presenting at least the bounded area of the at least one non-highlighted field of the item in the background color; and in response to the user selecting either the item or the related item, changing the at least one non-highlighted field of the item to at least one highlighted field of the item by changing the color of the bounded area of the at least one non-highlighted field from said background color to a second color.

13. The method of claim 11, wherein the third color is a lighter shade or a darker shade of the second color.

14. The method of claim 9, further comprising:
applying a third color to at least one second field of the plurality of displayed fields of the list item based on the value or the symbol of said at least one second field,
wherein said at least one second field is different from said color coded field of the list item, wherein said at least one second field is different from said at least one non-highlighted field, and
in response to the user selecting either the item or the related item, changing the at least one non-highlighted field of the item to at least one highlighted field of the item by changing the color of the at least one non-highlighted field from said background color to the second color while maintaining the color coded field in the first color and the color of the at least one second field in the third color,
wherein the third color, the first color, the second color, and the background color are different from one another.

15. The method of claim 9, wherein said color coded field of the item includes data concerning identifying characteristics of the item, and wherein said first color is determined based on specific identifying characteristics of said color coded field.

16. The method of claim 15, wherein said identifying characteristics identify at least one of an origin, a subject matter, and a priority of the list item.

17. A system comprising a display device which is configured to display a graphical user interface being generated from computer-implemented instructions stored in a computer-readable storage medium, the computer-implemented instructions operable when executed by a processor to display a plurality of items, each item having a plurality of displayed fields, and each of the plurality of displayed fields including a value or a symbol within the displayed field, the graphical user interface comprising:
at least one color coded field associated with an item, said at least one color field belonging to the plurality of displayed fields of the item, said at least one color coded field having a first color, wherein the first color is determined based on the value or the symbol of the color coded field; and
at least one other field associated with the item, said at least one other field belonging to the plurality of displayed fields of the item and other than the at least one color coded field, said at least one other field having a background color when the item is unselected and a second color when the item is selected while maintaining the at least one color coded field in the first color,
wherein said first color, said second color, and said background color are different from one another.

18. The system comprising the interface of claim 17, wherein the graphical user interface is configured to be operable, in response to a user selecting the item and without subsequent user intervention, to apply a second color to the at least one other field while maintaining the at least one color coded field in the first color, and to present at least one of a plurality of related items related to the item;

said at least one field of the plurality of displayed fields of each said related items having a third color while maintaining the at least one color coded field of the item in the first color, wherein said third color, said first color, said second color, and said background color are different from one another.

19. The system comprising the interface of claim 18, wherein said third color is determined from said second color, and wherein said third color is one of a lighter shade of said second color and a darker shade of said second color.

20. The system comprising the interface of claim 17, wherein the graphical user interface is configured to be operable to apply a third color to at least one second field of the plurality of displayed fields of the list item based on the value or the symbol of said at least one second field, wherein said at least one second field is different from said color coded field of the list item, wherein said at least one second field is different from said at least one other field of the item, and the graphical user interface is configured to be operable, in response to the user selecting either the item or the related item, to change the color of the at least one other field from the background color to the second color while maintaining the color of color coded field in the first color and the color of the at least one second field in the third color, wherein the third color, the first color, the second color, and the background color are different from one another.

* * * * *